United States Patent
Yu et al.

(10) Patent No.: US 7,073,571 B2
(45) Date of Patent: Jul. 11, 2006

(54) INTEGRATED CONDENSER OIL COOLER WITH A RECEIVER/DRYER

(75) Inventors: Wen Fei Yu, Ann Arbor, MI (US); Ramchandra L. Patel, Southgate, MI (US); Manos Eliades, Belleville, MI (US); Jack Hall Riddle, II, Brighton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/948,023

(22) Filed: Sep. 23, 2004

(65) Prior Publication Data

US 2006/0060327 A1   Mar. 23, 2006

(51) Int. Cl.
*F28F 9/02* (2006.01)

(52) U.S. Cl. .................. 165/140; 165/153; 165/175

(58) Field of Classification Search ................ 165/132, 165/134.1, 140, 149, 151–153, 172–176
See application file for complete search history.

(56) References Cited

U.S. PATENT DOCUMENTS

| | | | |
|---|---|---|---|
| 2,037,845 A | 4/1936 | Young | |
| 2,505,790 A | 5/1950 | Panthofer | |
| 3,774,678 A | 11/1973 | Glorisi | |
| 4,651,816 A | 3/1987 | Struss et al. | |
| 4,947,931 A | 8/1990 | Vitacco | |
| 5,303,770 A | 4/1994 | Dierbeck | |
| 5,537,839 A * | 7/1996 | Burk et al. ................. | 165/132 |
| 5,813,249 A * | 9/1998 | Matsuo et al. ............. | 165/132 |
| 6,119,340 A * | 9/2000 | Insalaco et al. ............ | 165/174 |
| 6,394,176 B1 | 5/2002 | Marsais | |
| 6,430,945 B1 * | 8/2002 | Haussmann ................. | 165/175 |
| 6,679,319 B1 | 1/2004 | Kato | |
| 2001/0050160 A1 | 12/2001 | Ozawa et al. | |
| 2002/0157809 A1 * | 10/2002 | Kaspar et al. .............. | 165/173 |
| 2003/0085027 A1 | 5/2003 | Koyama | |
| 2003/0209344 A1 | 11/2003 | Fang et al. | |
| 2004/0216863 A1 * | 11/2004 | Hu ............................ | 165/140 |
| 2005/0211425 A1 * | 9/2005 | McKittrick et al. ......... | 165/174 |
| 2006/0021746 A1 * | 2/2006 | Lorentz et al. ............. | 165/174 |

FOREIGN PATENT DOCUMENTS

| | | |
|---|---|---|
| JP | 2089998 | 3/1990 |
| JP | 4369396 | 12/1992 |

* cited by examiner

*Primary Examiner*—Teresa J. Walberg
(74) *Attorney, Agent, or Firm*—Brinks Hofer Gilson & Lione

(57) ABSTRACT

A heat exchanger for a vehicle is provided, where the heat exchanger includes core having first, and second sets of flow tubes extending between first and second headers and defining separate flow paths. One of the headers includes a first portion in fluid communication with the first set of flow tubes and a second portion defining a receiver/dryer chamber that is in fluid communication with the second set of flow tubes. A dryer is located within the receiver/dryer chamber.

21 Claims, 4 Drawing Sheets

INTEGRATED CONDENSER OIL COOLER WITH A RECEIVER/DRYER

BACKGROUND

1. Field of the Invention

The present invention relates generally to a transmission system and an air conditioning system for a motor vehicle and, more specifically, to a heat exchanger having an integrated oil cooler and condenser with a receiver/dryer. The oil cooler is in included within the transmission system, and the condenser component of the integrated device is in fluid communication with the air conditioning system.

2. Related Technology

Oil coolers for automotive vehicle transmission systems typically include a pair of headers and a core having a plurality of tubes disposed horizontally between the two headers. Heated oil from the transmission flows through the tubes and a stream of cooling fluid, such as air, flows across the tubes in order to remove heat from the oil. An oil inlet is connected to one of the headers and an oil outlet is connected to either the same or the other header. Within the headers, baffles may be provided to divide the interior space of the headers into more than one fluidly separate chambers. Through proper placement of the baffles, the oil can be caused to flow in a serpentine fashion making more than one path through the tubes between the headers.

Condenser assemblies for automotive vehicle air conditioning systems operate in a similar manner to oil coolers. More specifically, condenser assemblies typically include a pair of headers and a core having a plurality of tubes, through which refrigerant flows and across which the cooling fluid flows. A condenser inlet is connected to one of the headers and a condenser outlet is typically disposed at the lower portion of either the same or the other header. Baffles may be provided within the headers divide the interior space of the headers into separate chambers, and as a result, the refrigerant may be caused to flow in a serpentine fashion making more than one path through the tubes between the headers.

Condenser assemblies often include an integrated receiver/dryer into which the refrigerant flows in order to be separated into gas and liquid portions. Because the presence of water in the refrigerant will degrade the performance and structural integrity of the air conditioning system, a dryer is often associated with or located within the receiver. The dryer is located within the receiver so that the dryer is in contact with the liquid portion of the refrigerant facilitating the removal of water from the refrigerant. The dryer may itself be comprised of a bag or cartridge containing dryer granules, such as desiccant.

The oil cooler and the condenser have been integrated into a single heat exchanging device, as disclosed by U.S. Pat. No. 6,394,176. Such heat exchanger includes a left header, a right header, a core extending therebetween, and includes the above-discussed baffles for directing the respective fluids in a serpentine fashion and preventing mixing between the respective fluids.

An integrated oil cooler and condenser having a dryer is not currently known in the art. One concern, however, is preventing and detecting potential leakages between the two fluids of the integrated systems.

SUMMARY

In one configuration of the present invention, an integrated fluid cooler and fluid condenser for a vehicle is provided with a core having a first set of flow tubes extending between first and second ends of the core and a second set of flow tubes extending between the first and second ends of the core. A first header is connected to the first end of the core and is in fluid communication with the first and the second sets of flow tubes. A second header is connected to the second end of the core. The second header includes a first portion in fluid communication with the first set of flow tubes and a second portion defining a receiver/dryer chamber in fluid communication with the second set of flow tubes. Located within the receiver/dryer chamber is a dryer.

In another configuration of the integrated fluid cooler and fluid condenser, the second header extends from a top portion to a bottom portion of the core and the receiver/dryer chamber is defined by a collection tube. Furthermore a portion of the second header includes receiver chamber in fluid communication with the first set of flow tubes and the receiver chamber is also defined by the collection tube.

In yet another configuration of the integrated fluid cooler and fluid condenser, the receiver chamber and the receiver/dryer chamber of the second header are divided by a separator located within the collection tube. The separator includes a first rim forming a substantially fluid-tight first seal with the collection tube and a second rim forming a substantially fluid-tight second seal with the collection tube. Furthermore, the separator includes a trough located between the first seal and the second seal. The trough and the collection tube cooperate to define a leak chamber, and the collection tube further includes a bore extending through the collection tube and being in fluid connection with the leak chamber.

In yet another configuration of the integrated fluid cooler and fluid condenser, the second header includes a chamber being at least partially defined by a plate extending from the collection tube of the second header. The plate includes a generally-arcuate cross-section taken along a plane generally parallel to the flow direction. Furthermore, the plate and the collection tube of the second header comprise a single, unitary part.

In still another configuration, the integrated fluid cooler and fluid condenser includes a manifold cooperating with the housing to define a first manifold chamber and a second manifold chamber. The first manifold chamber is in fluid communication with the first set of flow passages and the second manifold chamber is in fluid communication with the second set of flow passages. Furthermore, the receiver/dryer chamber is in fluid communication with the second manifold chamber.

In another configuration of the present invention, a leak detection assembly for an integrated fluid cooler and fluid condenser for a vehicle is provided. The leak detection assembly includes a collection tube having a wall; a separator having a first rim forming a substantially fluid-tight first seal with the wall and a second rim forming a substantially fluid-tight second seal with the wall; and a leak detection bore located between the first seal and the second seal. The separator further includes a trough defined by the first rim and the second rim. The trough and the collection tube cooperate to define a leak detection chamber in fluid communication with the leak detection bore. The separator is a single, unitary part having a generally circular cross-section.

DETAILED DESCRIPTION

Figure 1:
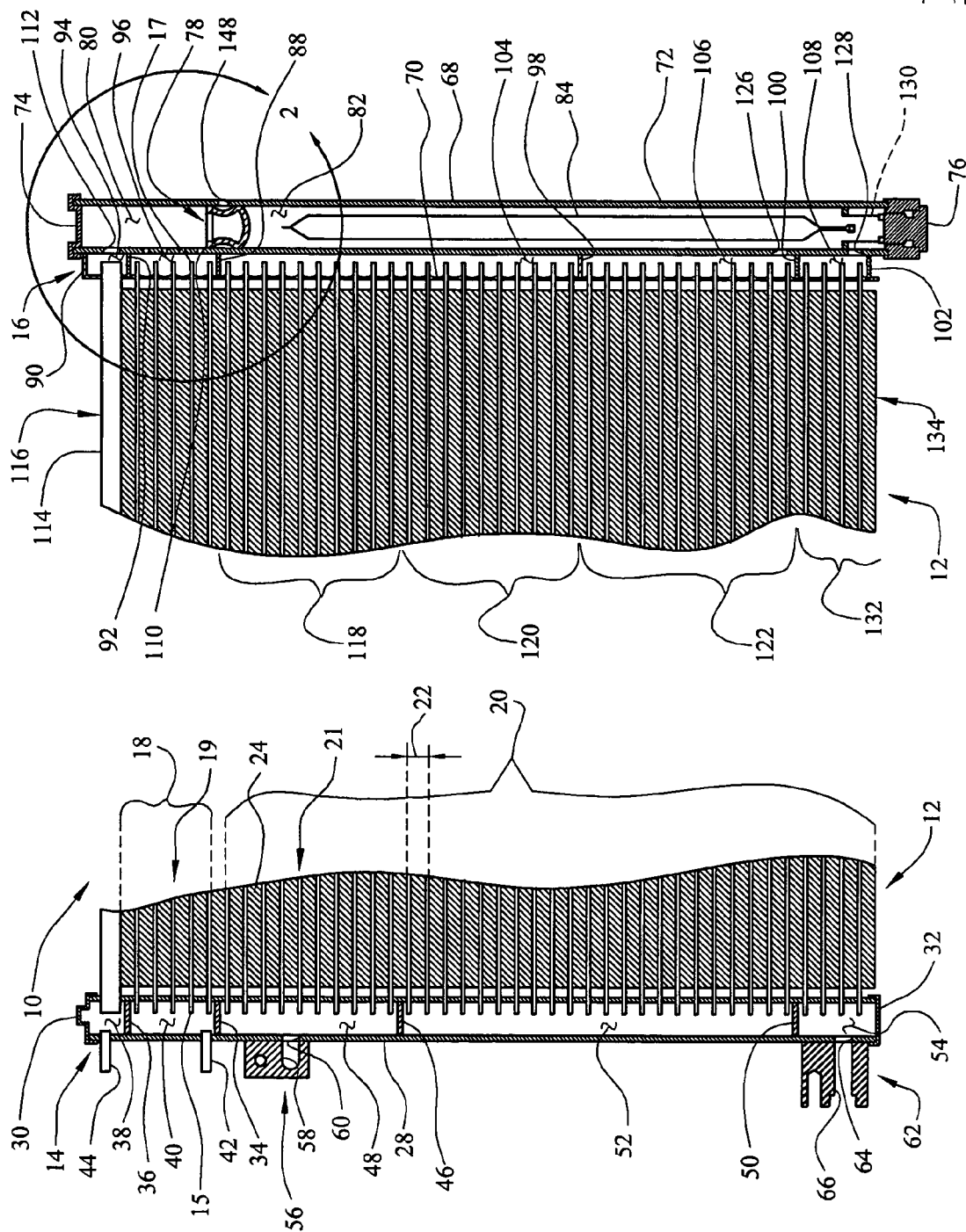
FIG. 1 shows an integrated condenser and oil cooler having a receiver/dryer and embodying the principles of the present invention.

Referring now to the drawings, FIG. 1 shows an integrated fluid cooler and fluid condenser assembly 10 embodying the principles of the present invention. The integrated fluid cooler and fluid condenser assembly 10 is a heat exchange device configured to receive a first fluid, such as oil from a motor vehicle transmission, and a second fluid, such as a refrigerant from a vehicle air conditioner. The integrated fluid cooler and fluid condenser assembly 10, hereinafter referred to as the cooler/condenser assembly 10, includes a core 12, a first header 14, and a second header 16. The headers 14 and 16 are located at opposing ends of the core 12, as will be further discussed below.

The core 12 includes a first end 15 extending into the first header 14 and a second end 17 of the core 12 extends into the second header 16. The core 12 further includes a tube stack comprising a first set of flow tubes 18 and a second set of flow tubes 20, each set extending between the headers 14, 16. The first set of tubes 18 includes oil tubes 19 in fluid connection with the transmission of the motor vehicle to receive and cool heated oil. Furthermore, the second set of tubes 20 includes refrigerant tubes 21 in fluid connection with the air conditioner to receive and cool refrigerant. The tubes 19, 21 are generally parallel to each other and are vertically stacked with respect to each other. Adjacent tubes 19, 21 are generally evenly-spaced apart from one another such that a gap 22 is located therebetween. The tubes 19, 21 themselves may be of any appropriate construction. In one preferred embodiment, the tubes 19, 21 are generally flat and include portions defining one or more flow channels longitudinally through the tube. The respective sets of tubes 18, 20 may have similarly-designed tubes 19, 21 or they may each have distinctive types of tubes.

Located within the gaps 22 between each adjacent tube 18 is a fin 24 for increasing heat transfer between the respective tubes 19, 21 and an airflow across the tubes 18,20 of the cooler/condenser assembly 10. The fins 24 exhibit a generally corrugated shape comprising a series of convolutes as is commonly known in the industry. Generally, the fins 24 extend completely across the gap 22 contacting the tube located thereabove and the tube located therebelow. In the figures, the details of the shape of the fins 24 are not illustrated in significant detail since those skilled in this technology will readily appreciate such a construction. Additionally, the fins 24 are preferably provided with a series of louvers on each corrugation in order to aid in the heat transfer efficiency to the air passing therethrough. The fins 24 are provided in such a manner that the overall length of the tubes 19, 21 is greater than the assembled length of the fins 24. Thus, the ends of the tubes 19, 21 extend beyond the end of the fins 24. These first and second ends 15, 17 of the core 12 are respectively received within the first and second headers 14, 16 such that the tubes 19, 21 are in fluid communication with the first and second headers 14, 16.

The first header 14 (hereinafter the "inlet/outlet header" or "I/O header") is shown on the left-hand side of FIG. 1. The I/O header 14 is preferably constructed of a cylindrical tube or member 28 that has a constant cross-sectional profile, round in the preferred embodiment, over its length. The top and bottom ends of the cylindrical tube 28 are respectively engaged and closed by top and bottom caps 30, 32.

A plurality of partitions, dividers or baffles are preferably located within the cylindrical tube 28 so as to cooperate with the cylindrical tube 28 and the caps 30, 32 to define chambers. More specifically, a separator 34 is positioned within the cylindrical tube 28 between the first set of tubes 18 and the second set of tubes 20 and cooperates with another separator 88 (discussed below) to prevent mixture between the oil and the refrigerant. Furthermore, another partition 36 is positioned within the cylindrical tube 28 in order to separate the oil flow into an upper oil chamber 38 defined by the top cap 30, the cylindrical tube 28, and the partition 36, and a lower oil chamber 40 defined by the partition 36, the cylindrical tube 28, and the separator 34.

The lower oil chamber 40 is preferably in fluid connection with an oil inlet conduit 42, which receives heated oil flow from the vehicle transmission. Similarly, the upper oil chamber 38 is preferably in fluid connection with an oil outlet conduit 44, which returns cooled oil flow to the vehicle transmission.

The separator 34 also cooperates with the cylindrical tube 28, the bottom cap 32, and additional partitions to define further condenser chambers. More specifically, the separator 34, the cylindrical tube 28, and an upper partition 46 cooperate to define an upper condenser chamber 48, while another partition 50 cooperates with the partition 46, and the cylindrical tube 28 to define a middle condenser chamber 52. The lower partition 50, the cylindrical tube 28, and the bottom cap 32 cooperate to define the lower condenser chamber 54, commonly referred to as the super-cooled chamber. The separator 34, the partitions 36, 46, 50 and the tube 28 are preferably of an aluminum material in order to be brazed together. The separator 34, the partitions 36, 46, 50 may have similar designs to each other or they may be different from each other.

The upper condenser chamber 48 is in fluid communication with a refrigerant inlet block 56 in order to receive refrigerant from the air conditioner system. More specifically, refrigerant flows into a refrigerant inlet conduit 58 in the refrigerant inlet block 56, through an opening 60 in the cylindrical tube 28, and into the upper condenser chamber 48.

Similarly, the lower condenser chamber 54 is in fluid communication with a refrigerant outlet block 62 in order to supply super-cooled refrigerant to the air conditioner system. More specifically, refrigerant flows out of the lower condenser chamber 54 through an opening 64 in the cylindrical tube 28, and into a refrigerant outlet conduit 66 in the refrigerant outlet block 62.

The remaining header 16 of the condenser assembly 10 is generally illustrated on the right hand side of FIG. 1. This header 16 is hereinafter referred to as the "receiver/dryer header" or "R/D header". The R/D header 16 is preferably an integrated structure made up of two components, a receiver/dryer 68 and a manifold 70, which will both now be discussed in more detail.

The receiver/dryer 68 preferably includes a cylindrical tube or member 72 having top and bottom ends, respectively closed by top and bottom caps 74, 76. The cylindrical tube 72 preferably exhibits a substantially constant cross-sectional profile along its length. More preferably, a generally round cross-sectional profile along its length. The receiver/dryer 68 includes a separator 78 that divides the cylindrical tube 72 into two chambers, an oil receiver chamber 80 and a receiver/dryer chamber 82 (hereinafter an "R/D chamber 82). More specifically, the top cap 74, the cylindrical tube 72, and the separator 78 define the receiver chamber 80 and the separator 78, the cylindrical tube 72, and the bottom cap 76 define the R/D chamber 82.

The R/D chamber 82 includes a drying element or, dryer 84. The dryer 84, shown in FIG. 1, comprises a dryer bag containing a water-absorbing component, such as desiccant material. The dryer 84 absorbs any water in it the refrigerant in order to improve the performance of the air conditioning system.

For obvious reasons, it is beneficial for the refrigerant to be sufficiently cooled and condensed before entering the R/D chamber 82. As a result, R/D chamber 82 is fluidly separated from the refrigerant flow until the refrigerant has traveled across the core 12 in a serpentine fashion a desired number of times. Furthermore, is it beneficial for the dryer 84 to be a relatively large component in order to contain a sufficient amount of dryer granulates. As a result, the receiver/dryer 68 preferably includes a relatively large R/D chamber 82 that houses the dryer 84 and that is fluidly separated from the refrigerant tubes 21 except for an appropriate portion of the receiver/dryer 68.

One design that achieves these objectives is the R/D header 16 shown in FIG. 1, having the receiver/dryer 68 and manifold 70 cooperate to define a plurality of manifold chambers, some of which are fluidly separated from the receiver/dryer chamber 82 and some of which are in fluid connection with the receiver/dryer chamber 82.

The manifold 70, the cylindrical tube 72, and a plurality of internal components, such as partitions, cooperate to define a plurality of manifold chambers. As shown in FIG. 1, a separator 88 is positioned between the manifold 70 and the receiver/dryer 68 in order to prevent mixing of fluids between the oil tubes 19 and the refrigerant tubes 21. The manifold 70 also preferably includes a top cap 90 and a partition 92 in order to define an upper oil chamber 94 and a lower oil chamber 96.

Additionally, an upper partition 98, a lower partition 100, and a bottom cap 102 are positioned, below the separator 88, between the manifold 70 and the receiver/dryer 68 to define an upper manifold chamber 104, a middle manifold chamber 106, and a lower manifold chamber 108.

Figure 2:
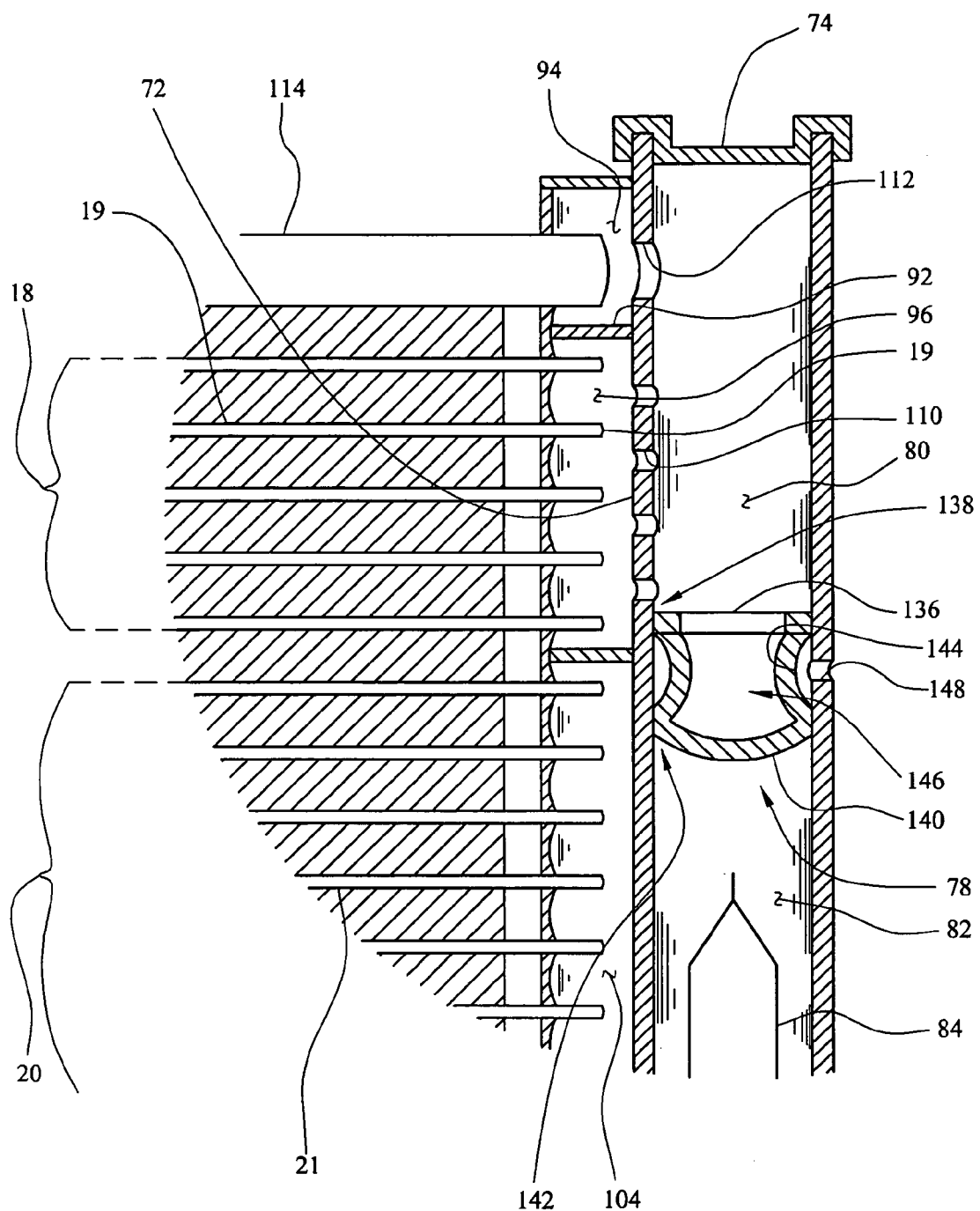
FIG. 2 is an enlarged view of a portion of the integrated condenser and oil cooler in enclosed within taken along line 2—2 of FIG. 1, showing a receiver/dryer chamber, a manifold receiver chamber, and a separator therebetween.

During operation of the cooler/condenser assembly 10, shown in FIGS. 1 and 2, heated oil from the vehicle transmission enters the lower oil chamber 40 of the first header 14 via the oil inlet conduit 42 and flows into the oil tubes 19. As it flows across the tubes 19, the heated oil becomes cooled. Next, the cooled oil enters the lower oil chamber 96 of the second header 16 and flows into the oil receiver chamber 80 via a plurality of openings 110 formed in the cylindrical tube 72. The oil flows out of the oil receiver chamber 80 and into the upper oil chamber 94 of the second header 16 via a second opening 112 formed in the cylindrical tube 72. Next, the oil flows back towards the first header 14 via a return tube 114, into the upper oil chamber 38 of the first header 14, out of the oil outlet conduit 44, and into the transmission of the motor vehicle.

The return tube 114 may have a cross-sectional area substantially greater than that of the oil tubes 19 in order to provide a desired flow capacity. More specifically, the return tube 114 preferably has a cross-sectional area that is substantially equal to the sum of the cross-sectional areas of the oil tubes 19. Furthermore, it is preferred that the return tube 114 is located at the top 116 of the core 12 in order to provide protection for the oil tubes 19 and the fins 24.

During operation of the condenser portion of the cooler/condenser assembly 10, the refrigerant enters the upper condenser chamber 48 of the first header 14 via the refrigerant inlet block 56 and flows into a first series 118 of the refrigerant tubes 21, where it is cooled. The refrigerant flows across the first series 118 of refrigerant tubes 21 and into the upper manifold chamber 104 of the second header 16. The refrigerant is then further cooled as it flows through a second series 120 of the refrigerant tubes 21 back toward the first header 14. Next, the refrigerant enters the middle condenser chamber 52, which is in fluid connection with a third series 122 of the refrigerant tubes 21. The refrigerant is further cooled as it flows through the third series 122, and it then enters the middle manifold chamber 106.

The middle manifold chamber 106 is in fluid connection with the R/D chamber 82 via an opening 126 in the cylindrical tube 72. The refrigerant flows through the opening 126 and into the R/D chamber 82, where the dryer 84 substantially absorbs the water portion of the refrigerant. Next, any gas portion of the refrigerant rises to the top of the R/D chamber 82 and thereafter only liquid refrigerant flows through a filter 130, through the second opening 128 in the cylindrical tube 72, and into the lower manifold chamber 108. The refrigerant next flows through a fourth series 132 of the refrigerant tubes 21 and into the lower condenser chamber 54 of the first header 14. In FIG. 1, the fourth series 132 of the refrigerant tubes 21 defines the bottom 134 of the core 12, but a protective plate or other appropriate structure may be provided to define the bottom 134 of the assembly. Finally, the refrigerant flows back into the air conditioner system via the refrigerant outlet block 62.

Figure 3:
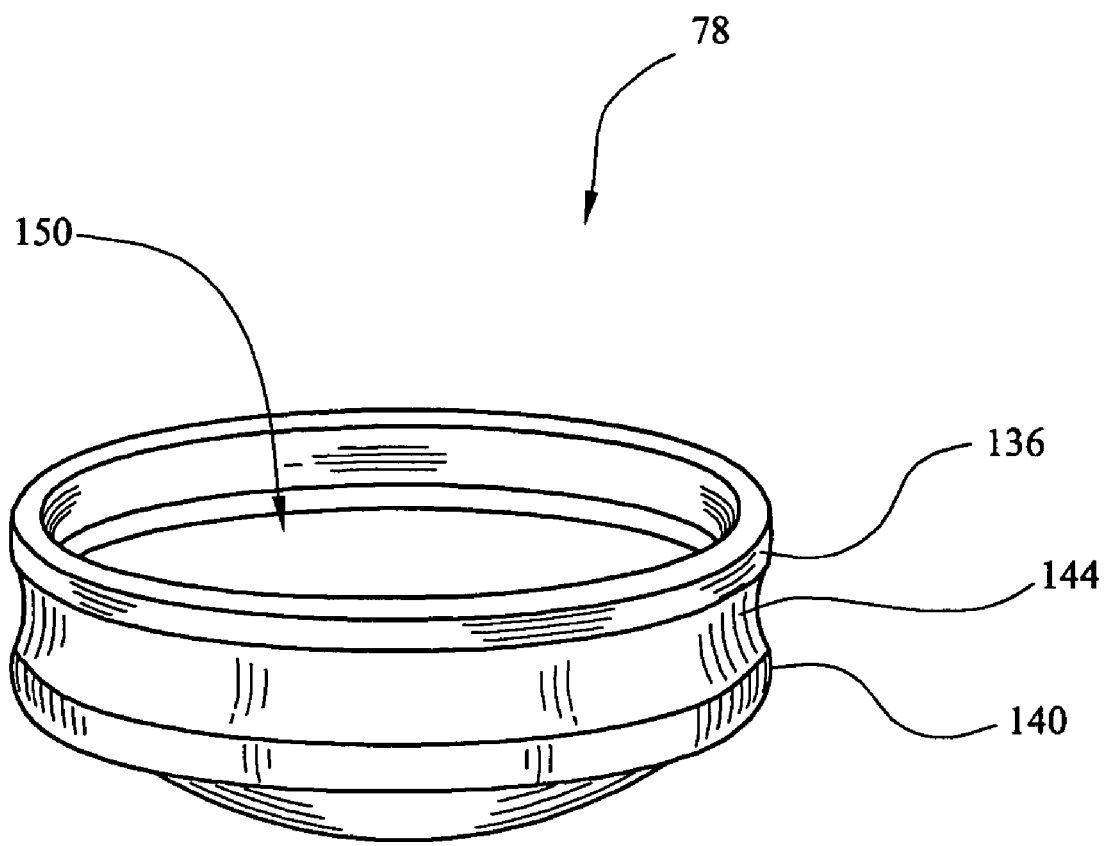
FIG. 3 is an enlarged isometric view of the separator shown in FIG. 2.

Referring specifically to FIGS. 2 and 3, an embodiment of the separator 78 will now be discussed in more detail. The separator includes a first rim 136, for forming a substantially fluid-tight first seal 138 with the cylindrical tube 72, and a second rim 140, also for forming a substantially fluid-tight second seal 142. Utilizing separate seals the first and second rims 136, 140 are preferably circular-shaped in order to engage the inner surface of the cylindrical tube 72. The first seal 138 prevents oil from escaping the oil receiver chamber 80 in the area adjacent to the separator 78 and the second seal 142 prevents refrigerant from escaping the R/D chamber 82 in the area adjacent to the separator 78. Utilizing separate seals, first and second seals 138, 142 provide double protection from the oil and refrigerant mixing with each other.

The separator 78, preferably, includes leak detection measures for detecting leaks between the seals 138, 142 and the cylindrical tube 72. More specifically, the separator 78 includes a reduced diameter portion 144 between the first and second rims 136, 140. The reduced diameter portion 144 cooperates with the cylindrical tube 72 to define a leak detection chamber 146 that receives any fluid that leaks through the separator 78, from either the oil receiver chamber 80 or the R/D chamber 82. Preferably the cylindrical tube 72 includes an opening 148 located between the first and second rims 136, 140 such that fluid in the leak detection chamber 146 flows through the leak detection opening 148 and is visible upon inspection or can be detected by an appropriate sensor.

Referring now to FIG. 3, an isometric view of the separator 78 from FIG. 2 is shown. The reduced diameter portion 144 is a trough formed in the outer diameter of the separator 78. Additionally, the separator 78 preferably includes a hollow interior 150 in order to reduce material costs and part weight. The separator may be formed of an aluminum material in order for it to be brazed with the cylindrical tube 72. Also, the separator 78 is sized so as to be preferably press-fit into the cylindrical tube 72 in a desired position, and then brazed with the cylindrical tube 72

Figure 4:
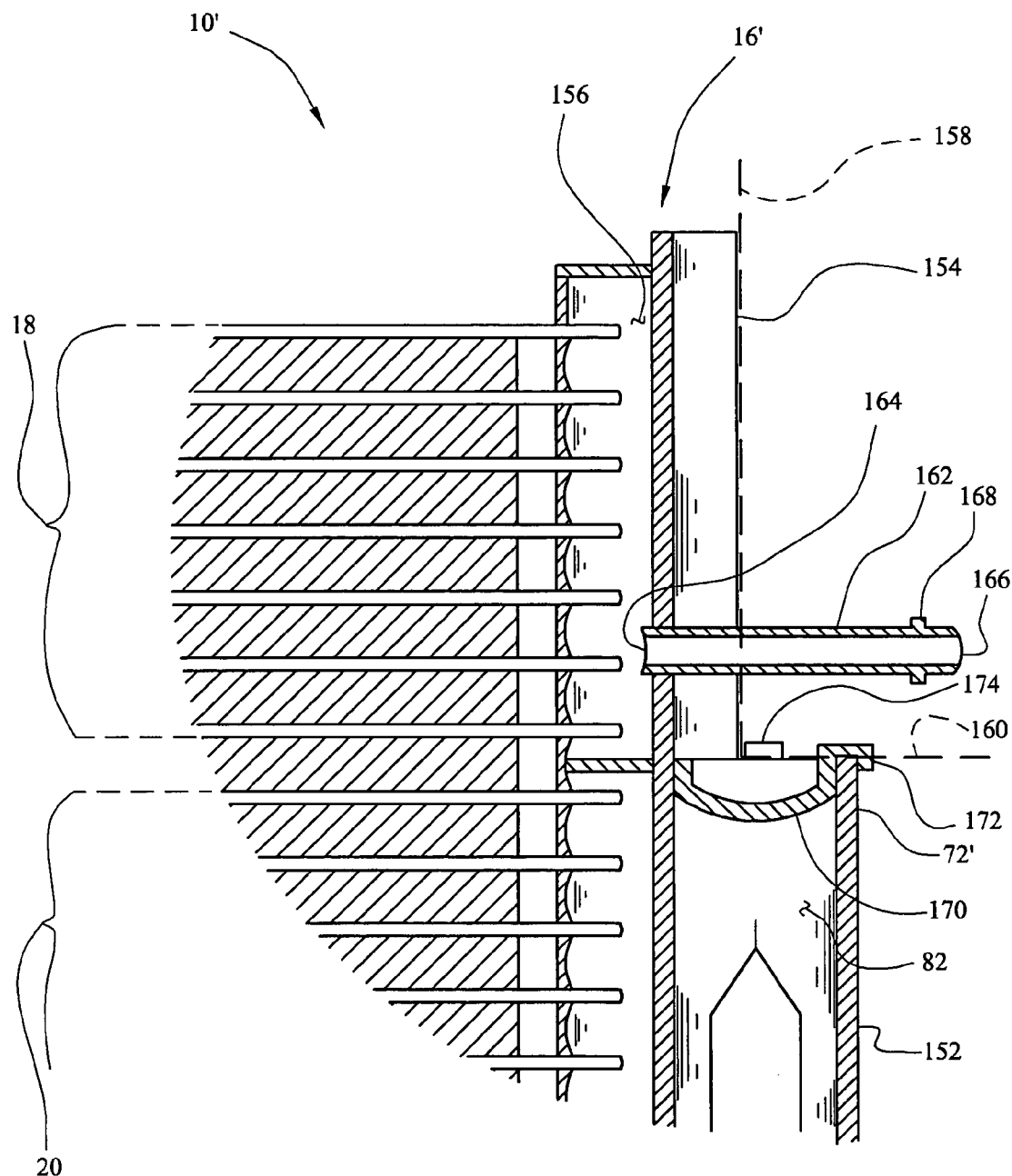
FIG. 4 is an enlarged view of an alternative embodiment of an integrated condenser and oil cooler having a receiver/dryer according to the principles of the present invention.

Referring now to FIG. 4, an alternative embodiment of the present invention is disclosed. A cooler/condenser assembly 10' having a second header 16' that is shorter than the core 12 is shown. More specifically, the second header 16' includes a tube 72' having a cylindrical portion 152 defining an R/D chamber and a plate portion 154 extending from the cylindrical portion 152 and cooperating with the manifold 70 to define a manifold chamber 156. In one configuration of this embodiment, the cylindrical portion 152 and the plate portion 154 are formed from a single, unitary piece. In order to manufacture the tube 72', a cylindrical component is preferably machined along a vertical machine path 158 and a horizontal machine path 160 to remove a portion of material from the cylindrical component. As a result of the machining operation, tube 72' shown in FIG. 4 is less bulky than the cylindrical tube 72 shown in FIGS. 1 and 2. Also as a result of the machining operation, the plate portion 154 shown in FIG. 4 preferably includes a substantially arcuate cross-section having a radius of curvature equal to that of the cylindrical portion 152.

The embodiment shown in FIG. 4 is also shown as including an outlet pipe 162 in fluid connection with the manifold chamber 156 and extending from the tube 72'. The outlet pipe 162 is utilized when no return tube is provided. More specifically, the outlet pipe 162 includes an inlet portion 164 extending into the manifold chamber 156 for receiving the cooled oil, and an outlet portion 166 through which the cooled oil exits the cooler/condenser assembly 10' and enters the air conditioner circuit. A locking rib 168 may be formed on the outer surface of the outlet pipe 162 adjacent to the outlet portion 166 in order to form a snap-fit connection with a component of the air conditioner circuit, such as an oil conduit (not shown). In the configuration shown in FIG. 4, the outlet pipe 162 is connected to the second header 16' rather than the first header 14, and therefore a return tube is not necessarily present.

Also shown in the embodiment of FIG. 4 is a top cap 170 that forms a substantially fluid-tight seal with the cylindrical portion 152 of the tube 72' in order to prevent refrigerant from leaking out of the top of the R/D chamber 82. The top cap 170 is preferably located at the top of the cylindrical portion 152 along the horizontal machine path 160. FIG. 4 shows a first tab 172 and a second tab 174 extending from the top cap 170 in order to secure the top cap 170 to the tube 72'. The top cap 170 also preferably includes a third tab (not shown) such that the three tabs define the points of a triangle. Furthermore, two of the three tabs are preferably located adjacent to edges of the plate portion 154 of the tube 72'. The top cap 170 and the tabs 172, 174 are preferably comprised of an aluminum in order to be brazed with the tube 72'. Therefore, during assembly, the tabs 172, 174 provide an initial press-fit connection with the tube 72' and provide a permanent brazed connection with the tube 72' after brazing occurs.

It is therefore intended that, the foregoing detailed description be regarded as illustrative rather than limiting, and that it be understood that it is the following claims, including all equivalents, that are intended to define the spirit and scope of this invention.

What is claimed is:

1. A heat exchanger for a vehicle comprising:
a core having a first set of flow tubes extending between first and second ends of the core, and a second set of flow tubes extending between the first and second ends of the core, wherein the first set of flow tubes defines a first fluid flow path and the second set of flow tubes defines a second fluid flow path fluidly separated from the first fluid flow path;
a first header connected to the first end of the core and being in fluid communication with the first set of flow tubes and with the second set of flow tubes;
a second header connected to the second end of the core, the second header including a first portion being in fluid communication with the first set of flow tubes and a second portion defining a receiver/dryer chamber being in fluid communication with the second set of flow tubes; and
a dryer located in the receiver/dryer chamber,
the second header extending from a tip portion to a bottom portion of the core;
the receiver/dryer chamber being defined by a collection tube;
the first portion of the second header including a receiver chamber being in fluid communication with the first set of flow tubes;
the collection tube having a generally cylindrical shape; and
the receiver/dryer chamber of the second header and the receiver chamber of the second header are separated by a separator located within the collection tube.

2. A heat exchanger as in claim 1, the collectior tube having a generally cylindrical shape.

3. A heat exchanger as in claim 1, wherein the separator includes a first rim forming a substantially fluid-tight first seal with the collection tube and a second rim forming a substantially fluid-tight second seal with the collection tube.

4. A heat exchanger as in claim 3, wherein the separator includes a trough located between the first seal and the second seal, the trough and the collection tube cooperate to define a leak detection chamber, and the collection tube includes a leak detection bore extending through the collection tube and being in fluid connection with the leak detection chamber.

5. A heat exchanger as in claim 1, wherein the first portion of the second header includes a chamber being at least partially defined by a plate extending from the collection tube of the second header.

6. A heat exchanger as in claim 5, wherein the plate includes a generally-arcuate cross-section taken along a plane generally parallel to the flow direction.

7. A heat exchanger as in claim 5, wherein the plate and the collection tube of the second header comprise a single, unitary part.

8. A heat exchanger as in claim 1, wherein the first header defines a first end of the integrated fluid cooler and fluid condenser, the first portion and the second portion of the second header defines a second end of the integrated fluid cooler and fluid condenser, and the second portion of the second header extends from the core a distance greater than the first portion of the second header extends from the core.

9. A heat exchanger as in claim 1, wherein the at least one first flow tube comprises an oil cooler and the at least one second flow tube comprises a condenser.

10. A heat exchanger for a vehicle comprising:
a core having a first end, a second end, a first set of flow tubes extending between the first and second ends, and a second set of flow tubes extending between the first and second ends, wherein the first set of flow tubes defines a first fluid flow path and the second set of flow tubes defines a second fluid flow path fluidly separated from the first fluid flow path;

a first header connected to the first end of the core and being in fluid communication with the first fluid flow path and with the second fluid flow path; and a second header connected to the second end of the core, the second header including:

a housing defining a receiver/dryer chamber;

a manifold cooperating with the housing to define a first manifold chamber and a second manifold chamber, the first manifold chamber being in fluid communication with the first set of flow passages and the second manifold chamber being in fluid communication with the second set of flow passages;

the receiver/dryer chamber being in fluid communication with the second manifold chamber; and a dryer located in the receiver/dryer chamber;

the core further including a top portion and a bottom portion, the first set of flow passages and the second set of flow passages extending along a flow direction between the first and second ends of the core, and the housing extending between the top portion and the bottom portion of the core in a direction generally perpendicular to the flow direction;

the housing including a first portion and a second portion, the first portion cooperating with the manifold to define the first manifold chamber, and the second portion defining the receiver/dryer chamber and cooperating to define the second manifold chamber;

the first portion of the housing defining a receiver chamber being in fluid connection with the first manifold chamber;

the first portion of the housing and the second portion of the housing being defined by a collection tube;

the first portion of the housing and the second portion of the housing being separated by a separator located within the collection tube; and the separator including a first rim forming a substantially fluid-tight first seal with the collection tube and a second rim forming a substantially fluid tight second seal with the collection tube.

11. A heat exchanger as in claim 10, wherein the first portion of the housing includes a generally circular cross-section taken along a plane generally parallel to the flow direction.

12. A heat exchanger as in claim 11, wherein the first portion of the housing includes a plate extending from the second portion of the housing.

13. A heat exchanger as in claim 12, wherein the plate and the second portion of the housing are a single, unitary part.

14. A heat exchanger as in claim 12, wherein the plate defines an outlet opening fluidly connecting an outlet conduit with the first manifold chamber.

15. A heat exchanger as in claim 10, wherein the separator includes a trough located between the first seal and the second seal, the trough and the collection tube cooperating to define a leak detection chamber, and the collection tube including a leak detection bore extending through the collection tube and being in fluid connection with the leak detection chamber.

16. A heat exchanger as in claim 10, wherein the plate includes a generally-arcuate cross-section taken along a plane generally parallel to the flow direction.

17. A heat exchanger as in claim 16, wherein the second portion of the housing is defined by a generally-cylindrical collection tube.

18. A heat exchanger as in claim 10, wherein the first set of flow tubes comprise an oil cooler and the second set of flow tubes comprise a condenser.

19. A heat exchanger for a vehicle comprising:

a core having a plurality of flow tubes;

a first header connected to a first end of the core and being in fluid communication with the flow tubes; and a second header connected to a second end of the core, the second header including:

a collection tube having a wall defining a first section and a second section, the first section being in fluid communication with at least a first tube of the plurality of flow tubes and the second section being in fluid communication with at least a second tube of the plurality of flow tubes;

a separator having a first rim forming a substantially fluid-tight first seal with the wall of the collection tube, a second rim forming a substantially fluid-tight second seal with the wall of the collection tube, and a trough between the first and second rims; and a leak detection bore located between the first seal and the second seal, the bore extending through the wall of the collection tube and being in fluid communication with the trough;

wherein the trough and the collection tube cooperate to define a leak detection chamber.

20. A heat exchanger as in claim 19, wherein the separator is a single, unitary part.

21. A heat exchanger as in claim 19, wherein the separator includes a generally circular cross-section.

* * * * *